United States Patent
Bio

(12) 
(10) Patent No.: US 6,637,790 B2
(45) Date of Patent: Oct. 28, 2003

(54) DEFORMABLE VEHICLE BUMPER GUARD

(76) Inventor: Giuseppe Bio, 2 Olympia Ct., Montville, NJ (US) 07045

( * ) Notice: Subject to any disclaimer, the term of this patent is extended or adjusted under 35 U.S.C. 154(b) by 0 days.

(21) Appl. No.: 10/331,202

(22) Filed: Dec. 30, 2002

(65) Prior Publication Data

US 2003/0085580 A1 May 8, 2003

Related U.S. Application Data

(63) Continuation of application No. 09/982,690, filed on Oct. 8, 2001, which is a continuation-in-part of application No. 09/293,471, filed on Apr. 13, 1999, now abandoned.

(51) Int. Cl.[7] ............................................. B60R 19/44
(52) U.S. Cl. ................................................ 293/142
(58) Field of Search ................................ 293/142, 143, 293/144, 145, 117; 296/98, 136

(56) References Cited

U.S. PATENT DOCUMENTS 3,289,611 A * 12/1966 Flanders
3,865,431 A * 2/1975 Zakhi
3,902,752 A * 9/1975 Pelletier
4,605,098 A * 8/1986 Leuty ............................ 182/92
4,799,609 A * 1/1989 Castilla ..................... 224/42.07
4,880,277 A * 11/1989 Takahashi et al. ........... 297/467
5,078,330 A * 1/1992 Hall ............................ 296/136
5,129,678 A * 7/1992 Gurbacki ..................... 280/770
5,197,381 A * 3/1993 Mells ........................... 108/44
5,364,155 A * 11/1994 Kuwahara et al. ........... 296/136
5,620,059 A * 4/1997 Crispeno ..................... 182/127
6,092,857 A * 7/2000 Rivas ........................... 296/136
6,112,360 A * 9/2000 Kalm et al. .................... 15/161
2003/0034660 A1 * 2/2003 Kelly ........................... 293/142

FOREIGN PATENT DOCUMENTS

DE          3245017      * 6/1984 ................. 296/98

* cited by examiner

Primary Examiner—Dennis H. Pedder
Assistant Examiner—H. Gutman
(74) Attorney, Agent, or Firm—Ralph T. Lilore

(57) ABSTRACT

A temporary and removable car bumper impact absorber protection device with adjustable straps for securing on or inside the trunk of an automobile has a cushioning material resting on and protecting the bumper of the automobile.

10 Claims, 2 Drawing Sheets

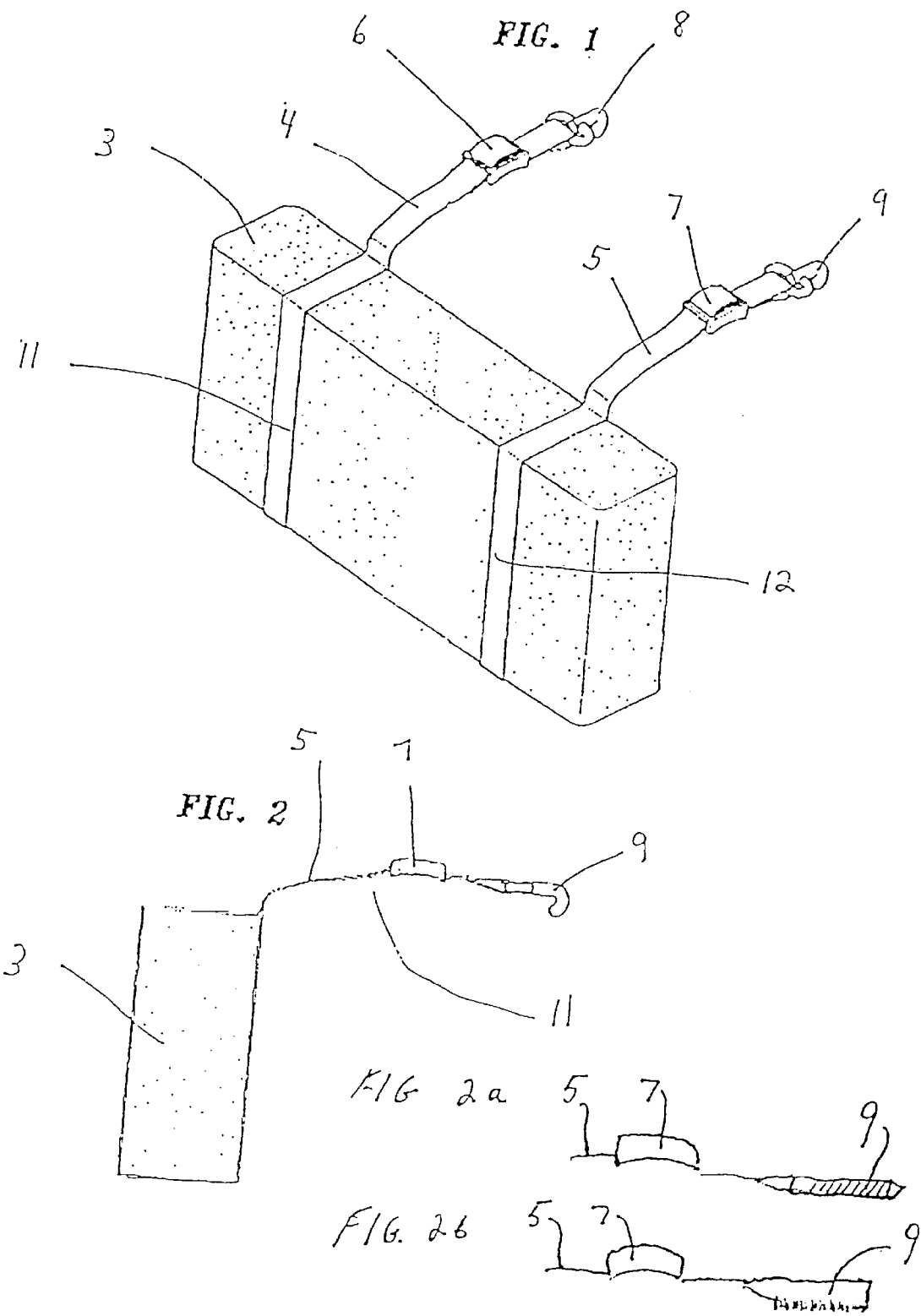

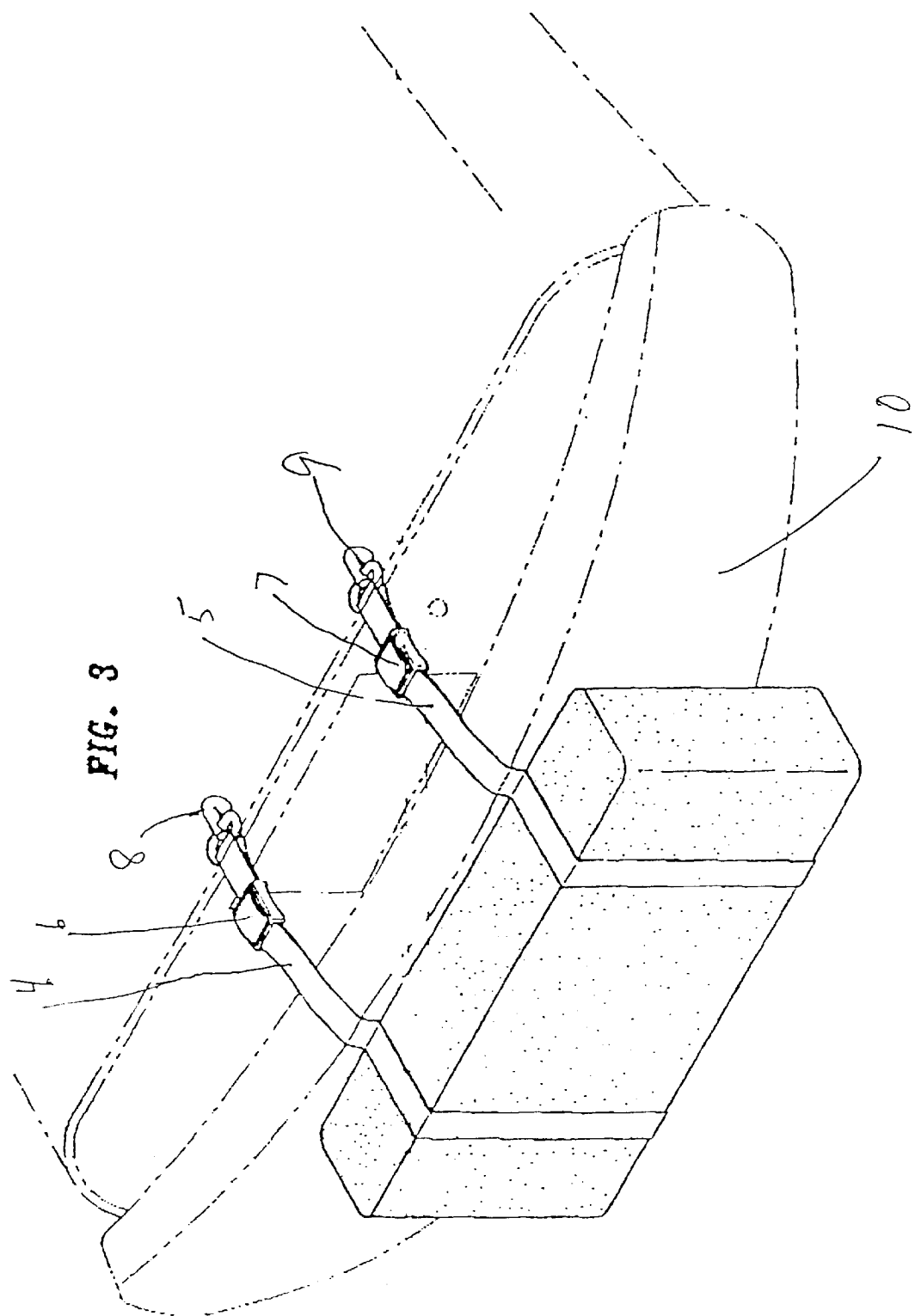

DEFORMABLE VEHICLE BUMPER GUARD

CROSS REFERENCE TO RELATED APPLICATIONS

This application is a continuation of U.S. Ser. No. 09/982,690 entitled Deformable Vehicle Bumper Guard filed Oct. 8, 2001 which in turn is a continuation-in-part of co-pending U.S. Ser. No. 09/293,471 entitled Deformable Vehicle Bumper Guard filed Apr. 13, 1999, now abandoned.

STATEMENT REGARDING FEDERALLY SPONSORED RESEARCH OR DEVELOPMENT (Not Applicable)

REFERENCE TO A SEQUENCE LISTING, A TABLE, OR A COMPUTER PROGRAM LISTING APPENDIX SUBMITTED ON COMPACT DISC (SEE 37 CFR 1.52(e)(5))

(Not Applicable)

BACKGROUND OF THE INVENTION

1. Field of the Invention

This invention relates to an automobile protection device and more particularly to protection of the bumper of an automobile, especially the rear bumper. The invention relates even more particularly to an automobile bumper protector which is effective at low speed impacts.

Bumpers are very easily damaged upon impact even at low impact velocities such as are encountered in the parking of vehicles. Cars are especially vulnerable when left at parking lots where, because of the tightness of space and the desire to cram as many cars as possible in the lot, the cars, especially the rear, are brought too closely into contact with the front of the next car.

This invention provides a temporary impact or crash absorber attachable to an automobile bumper to absorb the shock of low impact with another vehicle when the automobile is backed into the other vehicle during a parking operation. The impact absorber of the invention is portable and when put in place, allows the driver to hear and feel engagement with another vehicle before any scratches, dents, and other damage occurs on the surface of the bumper or of other parts of either car. Damage to both vehicles is thus minimized, if not eliminated.

The device of the invention is portable and can be readily attached to and removed from any automobile and is used only when it is desired to park the car, especially in parking lots. It is thus conveniently utilized whenever needed and is easily stored in the trunk of the automobile or with the parking attendant until needed.

2. Description of the Related Art including Information Disclosed under 37 CFR 1.97 and 1.98

(Not Applicable)

BRIEF SUMMARY OF THE INVENTION

The device of the invention is a portable impact absorber having "securing means" thereon such as straps which are used to secure the absorber to the car at a "securing location which is remote from the bumper" of the car yet allows the absorber to rest on and against the bumper thereby providing protection for the bumper. The straps are equipped with strap securing means on each end, such as hooks or the like for example, which can engage an appropriate securing location remote from the bumper such as an attachment or protrusion on the automobile or in the trunk of the automobile or the inside of the trunk itself and thus allow the absorber to hang from the securing location whether inside or outside of the trunk onto the bumper in protective engagement. The straps may also be adjustable via buckles or the like to allow for differences in dimensions of the rear bumpers and their distances from the securing location and may also be stretchable. As used herein, the term "securing location which is remote from the bumper" means any appropriate location on the automobile, except the bumper itself, for securing the straps. The bumper to be protected is not an appropriate securing means and is excluded from the definition thereof for various reasons chief among which is that the invention requires that the absorber loosely rest on the bumper to provide flexibility in swift and rapid deployment for use. In this regard, a securing location inside the trunk is most preferred. Thus, a corollary to the above definition is that the "securing means on the impact absorber" does not include means attachable to the bumper but only to a position remote from the bumper.

BRIEF DESCRIPTION OF THE SEVERAL VIEWS OF THE DRAWINGS

FIG. 1 is a perspective view of the invention.

FIG. 2 is an elevation of the right end of the device shown in FIG. 1.

FIG. 3 is a perspective view of the impact absorber mounted on the rear bumper of an automobile shown in dotted lines.

FIGS. 2a and 2b are views of alternative means of securing straps 4 and 5 to the securing location located inside the trunk of a car.

DETAILED DESCRIPTION OF THE INVENTION

Referring now to the Figures, in FIG. 1, a layer of deformable material 3 is provided as the basis for the device of the invention. The deformable material may be any cushioning material such as plastic foam, preferably styrofoam, pressed paper, cardboard or fabric, and elastic material such as rubber or a rubbery polymer such as synthetic rubbers or nitrites used as cushioning materials. The material is preferably one which bounces back to its original configuration, but does not have to be. Two adjustable straps 4 and 5 have adjustment buckles 6 and 7 which fit around and extend from deformable absorber 3. Straps 4 and 5 are preferably elastic, i.e. stretchable, materials though they do not have to be.

Affixed to adjustable straps 4 and 5 are strap securing means such as retaining hooks 8 and 9. Hooks 8 and 9 are adapted to hook onto any appropriate securing location such as protrusions available in the trunk of the car or outside the car, remote from the bumper, but preferably inside the trunk (see FIG. 3) and the buckles 6 and 7 adjusted so that absorber 3 rests and rides on the rear bumper 10 (FIG. 3) of the automobile and protects the same. A trunk door of the automobile (not shown) can be closed over the straps once hooks 8 and 9 or any other means capable of holding the straps are in place to help secure them. In addition to hooks 8 and 9 (see FIG. 1) and in place thereof, other fastening means such as screws and VELCRO™ brand fasteners of nylon fabric that can be fastened to itself. FIG. 2a shows the use of screws and FIG. 2b shows the use of VELCRO™ brand fasteners of nylon fabric that can be fastened to itself.

The presence of the adjustable buckles 6 and 7 provide the variability needed to account for any differences in dimensions from one car to another. Such adjustments may, therefore, be made with the absorber in place and the hooks 8 and 9 secured inside the trunk or elsewhere in or on the car, thus providing a good amount of flexibility from one car to another and ease of use without constant adjustment of screw-type adjusters found in the prior art.

As noted, straps 4 and 5 do not have to be elastic and may be of any material strong enough to handle the absorber such as leather, canvas, fabric, vinyl, or other plastic and the like. The remainder of the straps, i.e. pieces 11 and 12, are attached to the absorber 3 and provide the means by which the absorber is secured to the straps. While stretchable straps 4 and 5 are most preferred, they may also be of the non-elastic variety since adjustments 6 and 7 provide the means by which variations in length can be accommodated.

In the Figures, while absorber 3 is shown in FIG. 2 as being rectangular or box-shaped, it may be molded, if desired, to conform to curves expected to be found in car bumpers.

It is preferred to use only one absorber per car and for that reason, absorber 3 is preferably a length of about twelve inches to eighteen inches, a height of about six inches to eight inches, and a depth of about four inches to six inches to provide both a convenient size for handling and a sufficient coverage for most bumpers.

The length of the absorber is more than each of its height and thickness and preferably more than double the height. The thickness is preferably equal to the height, but may be less or more, but not usually less than the amount by which any bumper attachment protrudes from the bumper. The length of the absorber 3 is preferably substantial in relation to the length of the bumper, most preferably at least about ⅓ or more that of the bumper.

In various experimentations and trials, various embodiments of the invention have been made and tested for operability with very satisfactory results. Such tests included equipping an automobile rear bumper with the impact absorber of the invention and permitting a driver to park the car by driving directly backward into a stationary parked car at about five miles per hour and the car brakes applied upon notice of impact. The bumper guard was made of polystyrene, the straps were elastic and adjustable. The bumper guard of the invention absorbed the shock and prevented damage to either car.

The use of the absorber of the invention eliminates the need for using a plurality of smaller absorbers placed strategically around the bumper. When a relatively large portion of the bumper is covered by the absorber, damage resulting from angled orientations of the car can be minimized and it is not necessary to make certain that cars being parked are exactly aligned with one another. Since not all of the bumper is covered, the guard is easier to handle by the operator of the vehicle when it is applied.

There are other numerous features and advantages of the present invention including, without limitation, the following:

The impact absorbing structure has means for disengagingly attaching the strap to strap securing means on the automobile. This provides for temporary and repetitive coverage of the bumper, permitting storage in the trunk or removal of the device entirely, The structure is reusable being preferably constructed from impact absorbing and cushioning material.

The instant bumper protector is preferably part of a combination with the automobile. It is also temporary and removable.

It may be easily deployed by the simple maneuver of flipping the absorber out of the trunk and allowing it to rest against the bumper in a single step.

The invention thus contemplates a protected rear bumper of an automobile comprising (a) a rear automobile bumper attached to said automobile, said automobile comprising a securing location remote from said bumper, (b) a structure of a reusable impact absorbing material covering at least part of said bumper, (c) at least two flexible straps attached to said impact absorbing material structure and extending outwardly therefrom, said straps being adjustable in length and terminating in ends consisting essentially of securing means disengagingly attached to said securing location remote from said bumper.

The invention also contemplates a method for protecting the rear bumper of an automobile. The method comprises in combination:

(a) providing the rear automobile bumper attached to said automobile, said automobile comprising a securing location remote from said bumper, (b) providing a structure of a reusable impact absorbing material for covering at least part of said bumper, at least two flexible straps attached to said impact absorbing material structure and extending outwardly therefrom, said straps being adjustable in length and terminating in ends consisting essentially of securing means disengagingly attachable to said securing location remote from said bumper, (c) attaching said securing means to said securing location, (d) deploying the impact absorbing material to cover at least a part of said bumper.

What is claimed is:

1. An automobile comprising a rear bumper to be protected, a trunk adjacent said rear bumper, a reusable, portable protective absorber arrangement having a resilient perimeter comprising an impact-absorbing component resting on said rear bumper, said trunk comprising a securing location for securing, and at which, said protective absorber arrangement is disengageingly secured to said automobile, said protective absorber arrangement consisting essentially of:

(a) said impact-absorbing structure resting on and covering a part of said rear bumper to be protected, and (b) at least two flexible straps attached to said impact-absorbing component and extending outwardly therefrom, said straps being adjustable in length and terminating in ends consisting essentially of strap securing means disengagingly attachable to said securing location.

2. The protective absorber arrangement of claim 1 wherein the impact-absorbing component is constructed of a cushioning material comprising deformable plastic, resin, natural or synthetic rubbers, paper, cardboard, or fabric.

3. The protective absorber arrangement of claim 2 wherein the cushioning material comprises polystyrene foam.

4. The protective absorber arrangement of claim 2 wherein the flexible straps comprise adjustable buckles suitable for adjusting the length of said straps from said protective absorber arrangement.

5. The protective absorber arrangement of claim 4 wherein the strap securing means comprises hooks, screws, or hook and loop type fasteners of nylon fabric.

6. The protective absorber arrangement of claim 5 wherein said strap securing means comprises hooks.

7. The protective absorber arrangement of claim 6 wherein said straps are stretchable.

8. The method comprising:
   (a) providing an automobile comprising a rear bumper to be protected, and a trunk adjacent said rear bumper,
   (b) providing a reusable, portable protective absorber arrangement to protect said rear bumper,
      (i) said trunk comprising a securing location for securing, and at which, said protective absorber arrangement is disengagingly secured to said automobile
      (ii) said protective absorber arrangement consisting essentially of an impact-absorbing component having a resilient perimeter for covering a part of said rear bumper, at least two flexible straps attached to said component and extending outwardly therefrom, said straps being adjustable in length and terminating in ends consisting essentially of strap securing means disengagingly attachable to said securing location,
   (c) attaching said strap securing means to said securing location,
   (d) deploying said impact-absorbing component to cover said part of said rear bumper to be protected.

9. The method of claim 8 wherein the absorber arrangement is constructed of a cushioning material comprising deformable plastic, resin, natural or synthetic rubbers, paper, cardboard, or fabric.

10. The method of claim 9 wherein the cushioning material comprises polystyrene foam.

* * * * *